United States Patent [19]

Bernhagen

[11] 4,343,563

[45] Aug. 10, 1982

[54] TAPERED SPLINE AND METHOD OF MANUFACTURING SAME

[75] Inventor: James R. Bernhagen, Eldridge, Iowa

[73] Assignee: Caterpillar Tractor Co., Peoria, Ill.

[21] Appl. No.: 245,240

[22] PCT Filed: May 16, 1980

[86] PCT No.: PCT/US80/00578

§ 371 Date: May 16, 1980

§ 102(e) Date: May 16, 1980

[87] PCT Pub. No.: WO81/03296

PCT Pub. Date: Nov. 26, 1981

[51] Int. Cl.³ ............................................. F16B 11/00
[52] U.S. Cl. .................................... 403/282; 403/359; 409/244
[58] Field of Search ............... 403/359, 372, 345, 282; 29/446, 557; 409/244; 408/19

[56] References Cited

U.S. PATENT DOCUMENTS

| | | | |
|---|---|---|---|
| 1,136,557 | 4/1915 | Ross | 403/359 X |
| 1,803,995 | 5/1931 | Chilton | 403/359 |
| 2,038,554 | 4/1936 | Edgar | 403/359 |
| 3,222,772 | 12/1965 | Leyner | 403/359 X |
| 3,360,961 | 1/1968 | Steiner | 403/359 X |
| 3,399,549 | 9/1968 | Nagele | 403/359 X |

FOREIGN PATENT DOCUMENTS 647554 12/1950 United Kingdom ................ 403/359

Primary Examiner—Andrew V. Kundrat
Attorney, Agent, or Firm—Wegner, Stellman, McCord, Wood & Dalton

[57] ABSTRACT

A first member (7) with a tapered spline (6) and a method of making same, which tapered spline (6) provides an improved backlash-free mating with a second member (10) having a conventional straight spline (9). The method of forming the spline (6) consists of distorting a first member (7) along its central axis (14), broaching the first member (7) to form a straight cylindrical spline, and returning the first member (7) to its undistorted condition whereby the straight spline becomes a tapered spline (6).

12 Claims, 4 Drawing Figures

(AFTER BROACHING)

TAPERED SPLINE AND METHOD OF MANUFACTURING SAME

DESCRIPTION

1. Technical Field

This invention relates to an improved spline and, more particularly, to a tapered spline and a method of manufacturing same.

2. Background Art

Splined surfaces and splined connections are well known in the art as are broaching methods for forming them. However, such prior art splined connections frequently have not perfectly matched and thus have permitted at least some degree of backlash between the connected components. Even for ideally matching splines, most materials have a tendency to distort slightly during operation, thereby permitting backlash. Over the lifetime of the splined components, the backlash tends to increase as wear between the components occurs.

There are many uses of splined components where elimination of backlash is particularly important. One example is found in U.S. Pat. No. 3,951,481 to Ritter, Jr., issued Apr. 20, 1976, and owned by the common assignee of the present application which shows a drive unit having a splined hub located between a second fixed hub and bearings. In this unit it is desirable to maintain a precise loading on the bearings. However, because of the backlash of the splined hub, the hubs tend to rub together and wear down, thereby reducing the load applied through the hubs to the bearings. U.S. Pat. No. 3,951,481 uses a plurality of pins to apply the preload rather than the splined hub because of the wear which the hub incurs.

The present invention is directed to overcoming one or more of the problems as set forth above.

DISCLOSURE OF INVENTION

In one aspect of the present invention, there is a component having a tapered spline, at least a portion of which is smaller in diameter than a cylindrical mating spline, thereby providing an improved mating.

In another aspect of the present invention, there is a method for forming a tapered spline which comprises the steps of distorting a member which is to be splined, broaching that member to form a cylindrical spline, and returning the member to its undistorted configuration.

In a variety of situations, it is desirable to have a splined connection which allows substantially no backlash between the connected components. By providing one of the components with a tapered spline, an improved mating may be achieved which eliminates undesirable backlash, thereby preventing the wearing down of contacting surfaces. The elimination of wear in various situations also permits use of simpler and less time consuming methods of installing the splined components and further eliminates the need for induction hardening of the splined components.

By distorting the element before forming the spline, a tapered spline may be formed by using conventional broaching tools and methods and enables the backlash-free connection to be formed on existing hubs where desirable with no design change being required.

BEST MODE FOR CARRYING OUT THE INVENTION

Figure 1:
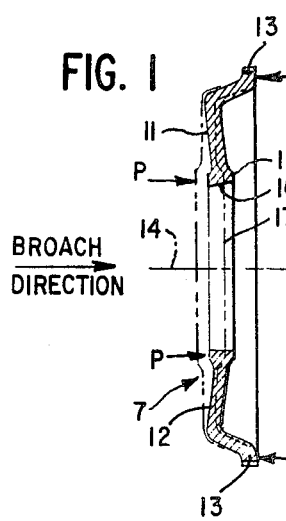
FIG. 1 is a cross-sectional view of the hub in its distorted condition prior to broaching, the distortion shown being exaggerated.
Figure 2:
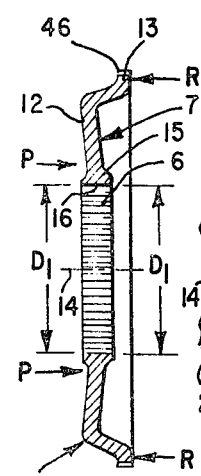
FIG. 2 is a cross-sectional view of the hub in its distorted condition after broaching has occurred.
Figure 3:
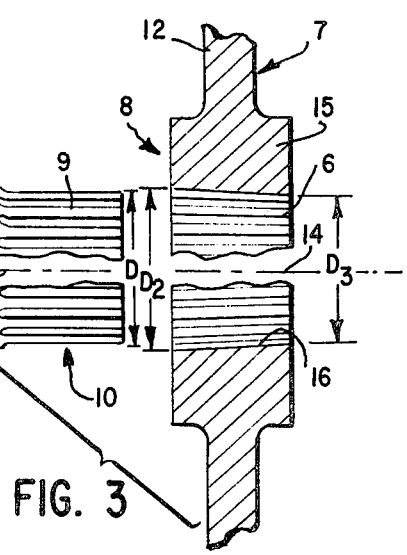
FIG. 3 is a broken cross-sectional view of the undistorted hub and a mating male spline, the taper of the female spline being exaggerated.

FIGS. 1 through 3 illustrate the steps employed in providing a tapered female spline 6 in a first member 7 for use in an improved, backlash-free spline connection 8 to a straight male spline 9 of a second member 10. For convenience of illustration, but without restriction to the use which is described, the first and second members 7 and 10, respectively, are defined in terms of a hub. The first member 7 has a hub 12, in which the internal spline 6 is cut in the present illustrated embodiment, has a disc-shaped body portion 11 with a radially outwardly directed flange 13 about the outer periphery thereof and a radially inwardly directed collar 15 having, as shown in FIG. 1, a cylindrically-shaped wall 16 defining an axially directed hole or aperture 17 having a central axis 14. The central axis 14 extends perpendicular to the plane of the hub 12. Initially, external forces P,R are applied to distort the hub 12 along the central axis 14 as shown in exaggerated form in FIG. 1. The external force R at the perimeter of the flange 13 of the hub 12 is actually a reactive force which results when the flange 13 is abutted either against a fixed surface of a tool or jig for use in the broaching machine or against one jaw of a clamping device. The force P is a distorting force applied evenly about the axial periphery of the collar 15 of the hub 12 which, for example, could be applied by a movable surface of a tool or jig or by the second jaw of a clamping device.

The interior hole or aperture 17 of the hub 12 is splined, such as by broaching, in a conventional manner with the direction of broaching being from the inwardly distorted side of the hub 12 to form the complete female spline 6 in the wall 16 of the collar 15 in a single pass. With the hub 12 distorted when the spline is machined into the collar 15, the female spline 6 thus formed is a uniform cylindrical spline as shown in FIG. 2. When the external forces P,R are thereafter removed, the hub 12 and collar 15 will return to an undistorted configuration, causing the spline 6 to be slightly tapered as shown in exaggerated form in FIG. 3.

With the hub 12 distorted, the female spline 6 is broached at a diameter $D_1$ which is equal to or slightly greater than D, the diameter of the male spline 9 (FIG. 3). When the external loads P,R are removed, the diameter on the concave side of the distortion increases to $D_2$ while the diameter on the opposite side decreases to $D_3$. The scale of these maximum and minimum diameters $D_2, D_3$ is such that $\frac{1}{2}$ to $\frac{3}{4}$ of the hub 12 may pass freely over the mating male spline 9. Thus, the taper is such that $[D_2 + D_3]/2 \geq D \geq [D_2 + 3D_3]/4$. Resultingly, at least $\frac{1}{4}$ of the female spline 6 is of a diameter slightly smaller than the male spline 9 and must be forced onto the male spline 9. By forcing the undersized portion of the female spline 6 over the male spline 9, a rigid connection between two components is created reducing or substantially eliminating backlash, a result which analytical study has shown would be exhibited by a tapered female spline.

The distortion of the hub 12 by the external loads P,R is very slight. Therefore, the hub 12 is not deflected beyond its elastic limit and automatically returns to its original shape after the external loads are removed. The resultant taper of the female spline 6 is also very slight. As an example, one hub was deflected and a spline was machined in the collar 15 thereof, resulting in a taper on the order of 0.1016 mm per 25.4 mm (0.004 inch per inch) of spline length. Thus the maximum and minimum diameters $D_2, D_3$ are greater than and less than the male spline diameter D by only a few thousandths of an inch. This enables the undersized portion of the female spline 6 to be forced over the larger male spline 9, requiring only a small amount of distortion of the mating surfaces, well within their permissable distortion ranges.

With the conventional cylindrical splines, the only way to eliminate backlash is to form a virtually perfect mating of splined surfaces and use material which is highly resistant to deformation, as by case hardening. To do so would be very expensive. By using the tapered spline of this invention, the elimination of backlash can be achieved without requiring that the spline be broached to create a perfect match. Since a portion of the female spline 6 is smaller in diameter than the matching male spline 9, the two splines must deform for the female spline 6 to pass around the larger male spline 9. This slight deformation work hardens the matching spline surfaces and results in a virtually perfect mating which is substantially free from backlash.

A tapered male spline providing the improved backlash-free mating of the above described embodiment may alternatively be formed to mate with a cylindrical female spline. The spline can be formed in essentially the same manner as the tapered female spline described above. If the element on which the male spline is formed is capable of being distorted appropriately (i.e. is relatively thin in comparison to its diameter), broaching can be done in a conventional manner on the distorted element as above. In this case however, the element would be fixed at its center when distorted.

INDUSTRIAL APPLICABILITY

Figure 4:
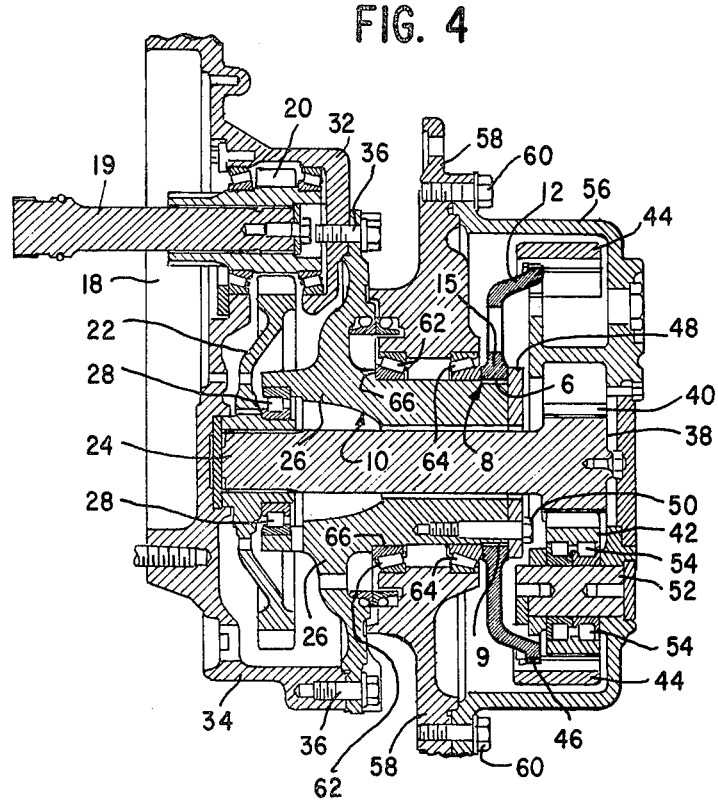
FIG. 4 is a cross-sectional view of an outboard planetary final drive unit containing a hub having the tapered spline of this invention.

A hub having a slightly tapered spline as taught herein may be used in any machine or drive train where it is imperative that backlash between spline connected parts be virtually eliminated. One example of an outboard planetary final drive unit having such a requirement is shown in FIG. 4.

Power is input to this unit as shown generally at 18, the power being transmitted from an engine (not shown) through a drive mechanism (also not shown) to a first shaft 19. The first shaft 19 has a spline connection with a first gear 20, which first gear 20 meshes with and drives a second gear 22 having a spline connection with a drive shaft 24.

Supporting the drive shaft 24 for rotation is a spindle 26 and a plurality of bearings 28. The spindle 26 is locked to the case assembly 32,34 by a plurality of bolts 36.

The proximal end 38 of the drive shaft 24 has gear teeth and acts as a sun gear 40. The sun gear 40 drives a plurality of planet gears, one of which is shown at 42. The planet gears 42 mesh with a fixed circumscribing ring gear 44. The ring gear 44 is fixed against rotation by a hub 12 which has a male spline 46 meshing with the ring gear 44 and a female spline 6 meshing with a mating male spline 9 on the spindle 26. Due to a need to eliminate backlash (as detailed below), this female spline 6 is tapered to provide the improved mating heretofore described. The collar 15 containing the female spline 6 is secured against axial movement by a locking hub 48 which is secured to the end of the spindle 26 by a plurality of bolts 50.

Each of the planet gears 42 has a rod 52 which is rotatable within bearings 54 inside the planet gear 42. Each rod 52 is rigidly fixed to the surrounding carrier 56, rotating the carrier 56 around the sun gear axis. For each rotation of the planet gear 42 around the sun gear 40, the rod 52 itself rotates one time around its own axis.

The carrier 56 is rigidly connected to a drive sprocket 58 by plurality of bolts 60 so that the drive sprocket 58 rotates with the carrier 56. The drive sprocket 58 is supported for this rotation around the spindle 26 by a plurality of bearings 62,64. The drive sprocket 58 is the final element in the drive train and directly applies the power to its intended use. A typical use is to drive an endless articulated track having shoes for powered movement of a vehicle.

It is desirable to establish a specific axial preload on the bearings 62,64 around the spindle 26 to prevent looseness and thus maintain optimum operation of the bearings 62,64. To accomplish this, the left set of bearings 62 in FIG. 4 rests against an annular shoulder 66 and a preload is applied to the right set of bearings 64. The preload is applied by establishing a precise thickness to the collar 15 containing the female spline portion 6 of the hub 12 so that it applies the desired pressure to the right bearings 64 when the hub 12 is itself pressured to the left by the locking hub 48.

A probability bearing adjusting method is used to preload the bearings which results in the majority of bearings 62,64 being loaded properly. The actual loading force is not measured but the correct force is established by proper axial sizing of the collar 15 of the female spline portion. This method is much simpler and less time consuming than prior preloading methods, requiring only that the locking hub 48 be secured to the end of the spindle 26. There is no need for shims, and, since this is a probability method, the locking hub 48 need not be adjusted for each bearing 64. Thus fewer bolts 50 are required to secure the locking hub 48 to the spindle 26.

Because the probability bearing adjusting method requires that precise dimensions be maintained around the female spline 6 of the hub 12 to keep the proper preload applied during operation, it is desirable to eliminate all backlash of the female spline connection. In the prior art, slight backlash at this connection caused the hubs 12,48 to wear down, resulting in an undesirable decrease in the preload on the bearings 62,64. For this reason, the backlash-free mating provided by the tapered spline of this invention is highly desirable at this location.

Other aspects, objects and advantages of this invention can be obtained from a study of the drawings, the disclosure and the appended claims.

I claim:

1. A method for forming a spline (6,9) on a first member (7,10) having a central axis (14), which spline (6,9) is tapered to provide an improved mating with a straight spline (6,9) on a second member (7,10), the steps comprising:

deflecting one of said members (7,10) along its central axis (14);

broaching said one member (7,10) to form a spline (6,9) on a deflected portion of said one member (7,10); and returning said one member (7,10) to its undeflected condition.

2. The method of claim 1, wherein the spline (6,9) formed on the deflected portion of the first member (7,10) has a diameter ($D_1$) in its deflected condition equal to or slightly greater than the diameter (D) of the straight spline (6,9) to which it is to be mated.

3. The method of claim 2, wherein the deflecting step comprises:

fixing a portion (13) of the first member (7,10) uniformly around its central axis (14); and applying a uniform load (P) to said first member (7,10) in a direction coaxial with said central axis (14) concentrically about the intended broaching surface.

4. The method of claim 3, wherein said broaching step forms a female spline (6) in said first member (7) and the first member (7) is fixed around its perimeter (13) during deflection.

5. The method of claim 3, wherein said broaching step forms a male spline (9) and the second member (10) is fixed at its center during deflection.

6. The method of claim 1, wherein the broaching step is performed in a single pass.

7. In a splined connection between a female member (7) and a male member (10), the improvement comprising a tapered spline (6) in the female member (7) capable of mating with a straight spline (9) on the male member (10).

8. The improvement of claim 7, wherein the diameter of the straight spline (9) is D, and the diameters at the opposite ends of the tapered spline (6) are $D_2$ and $D_3$ where $D_2 > D > D_3$.

9. The improvement of claim 7, wherein the taper is on the order of 0.1016 mm per 25.4 mm (0.004 inch per inch) of spline length.

10. The improvement of claim 7, wherein ½ to ¾ of said tapered spline (6) is larger in diameter than said straight spline (9) so that:

$$[D_2+D_3]/2 \geq D \geq [D_2+3D_3]/4$$

11. A planatary final drive unit having a splined connection between a female member (7) and a male member (10), the improvement comprising a tapered spline (6) in the female member (7) capable of mating with a straight spline (9) on the male member (10).

12. In a splined connection between a first member (7) and a second member (10), the improvement comprising a tapered spline (6) formed in a bore in said first member (7) during axial deformation of said first member, a straight spline (9) formed on the outside of said second member (10), the straight spline (9) of said second member mating with the tapered spline (6) of said first member (7).

* * * * *